(12) United States Patent
Pan et al.

(10) Patent No.: US 12,400,441 B2
(45) Date of Patent: Aug. 26, 2025

(54) BINARY NEURAL NETWORK-BASED LOCAL ACTIVATION METHOD AND SYSTEM

(71) Applicant: ZHEJIANG UNIVERSITY, Hangzhou (CN)

(72) Inventors: Yun Pan, Hangzhou (CN); Siqi Hui, Hangzhou (CN); Huaiyu Zhu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 364 days.

(21) Appl. No.: 18/024,457

(22) PCT Filed: May 18, 2021

(86) PCT No.: PCT/CN2021/094327
§ 371 (c)(1),
(2) Date: Mar. 2, 2023

(87) PCT Pub. No.: WO2022/077903
PCT Pub. Date: Apr. 21, 2022

(65) Prior Publication Data
US 2023/0316738 A1     Oct. 5, 2023

(30) Foreign Application Priority Data
Oct. 14, 2020   (CN) .......................... 202011097835.5

(51) Int. Cl.
*G06V 10/82* (2022.01)
*G06V 10/75* (2022.01)
*G06V 10/80* (2022.01)

(52) U.S. Cl.
CPC ............ *G06V 10/82* (2022.01); *G06V 10/751* (2022.01); *G06V 10/80* (2022.01)

(58) Field of Classification Search
USPC .................................................. 382/155–156
See application file for complete search history.

(56) References Cited

U.S. PATENT DOCUMENTS 10,831,444 B2 *  11/2020  El-Yaniv ................. G06F 7/523
11,010,638 B2 *   5/2021  Gupta ................... G06F 18/211
(Continued)

FOREIGN PATENT DOCUMENTS

| CN | 110472725 | 11/2019 |
| CN | 110929852 | 3/2020 |
| CN | 110956263 | 4/2020 |

OTHER PUBLICATIONS

Soares et al., A Class-Independent Texture Separation Method Based on Pixel-Wise Classification, Sensors 2020, 20, 5432:doi: 10.3390/s20185432, www.mdpi.com/journal/sensors, pp. 1-26. (Year: 2020).*

(Continued)

*Primary Examiner* — Ishrat I Sherali
(74) *Attorney, Agent, or Firm* — Jiwen Chen; Joywin IP Law PLLC

(57) ABSTRACT

A local activation method and system based on a binary neural network, said method including: during forward propagation, comparing the difference between a center pixel and an adjacent pixel to determine a local activation value; during forward propagation, setting an appropriate number of local activation channels and an activation direction to obtain a local activation feature map having different activation directions; during forward propagation, using weighting coefficients, which can be learned, to perform channel fusion on the output feature map after local activation and direct activation, and obtaining an output feature map containing both texture features and contour features; during backpropagation, using an asymptotic sine function to update the weights of the binary neural network. The (Continued)

invention is capable of effectively reducing the loss of information during binary activation, and can effectively reduce gradient mismatch during backward gradient update of a binary neural network, thereby improving the performance of the binary neural network.

10 Claims, 2 Drawing Sheets

(56) References Cited

U.S. PATENT DOCUMENTS

| | | | |
|---|---|---|---|
| 12,033,070 B2* | 7/2024 | Li | G06N 3/08 |
| 2017/0286830 A1 | 10/2017 | El-Yaniv et al. | |
| 2019/0244061 A1* | 8/2019 | Gupta | G06V 10/82 |
| 2020/0097818 A1* | 3/2020 | Li | G06N 3/08 |
| 2020/0167654 A1* | 5/2020 | Guo | G06N 3/063 |
| 2021/0350236 A1* | 11/2021 | Severa | G06N 3/063 |

OTHER PUBLICATIONS

Lin et al., Local Binary Pattern Networks, arXiv:1803.07125v2 [cs.CV] Mar. 22, 2018, pp. 1-16 (Year: 2018).*

* cited by examiner

BINARY NEURAL NETWORK-BASED LOCAL ACTIVATION METHOD AND SYSTEM

This is a U.S. national stage application of PCT Application No. PCT/CN2021/094327 under 35 U.S.C. 371, filed May 18, 2021 in Chinese, claiming priority of Chinese Application No. 202011097835.5, filed Oct. 14, 2020, all of which are hereby incorporated by reference.

TECHNICAL FIELD OF THE INVENTION

The present invention relates to the technical field of machine learning, in particular to a Binary Neural Network (BNN)-based local activation method and system.

BACKGROUND OF THE INVENTION

Deep Neural Network (DNN) is a machine learning model under supervised deep learning, which gradually extracts high-level features of images by combining low-level features. It is widely used in computer vision, including image classification, object recognition, semantic segmentation and target tracking. However, the DNN requires huge storage space and computing resources, which greatly limits its application on resource-constrained edge platforms.

In recent years, compression and acceleration of the DNN have gradually become hot research topics, in which a Binary Neural Network (BNN) can theoretically compress storage space by 32 times and accelerate the computation by 58 times by quantifying weights and activations of the DNN into {−1, +1} and replacing the convolution operation with the XNOR operation.

However, during the activation of the traditional BNN, the mismatch with updated gradients during back propagation due to the loss of local texture information will result in low accuracy of the BNN.

SUMMARY OF THE INVENTION

In order to overcome the defects existing in the activation process of a Binary Neural Network (BNN) and improve the performance of the BNN, the present invention provides a BNN-based local activation method and system.

A technical solution employed by the present invention to solve its technical problems is as follows.

A BNN-based local activation method is provided, comprising following steps of:
- comparing all pixels and adjacent pixels thereof in an input image during forward propagation, to determine a local activation value of each pixel;
- providing an appropriate number of local activation channels and activation directions during forward propagation, to obtain locally activated feature maps with different activation directions;
- fusing, by a weight coefficient that can be learned, the channels of the feature maps output after local activation and direct activation during forward propagation, to obtain the output feature maps containing both texture features and contour features; and
- updating, by an asymptotic sine function, weights of the BNN during back propagation, to obtain the BNN with updated gradients.

Further, in the step of comparing all pixels and adjacent pixels thereof in an input image during forward propagation, to determine a local activation value of each pixel, the local activation value is determined by:

$$LBA_i(x) = \text{sign}(x_i - x) = \begin{cases} -1 & x_i < x \\ +1 & x_i \geq x \end{cases};$$

wherein $LBA_i(x)$ is a local activation output in a specific activation direction, x represents a central pixel to be activated, $x_i$ represents the $i^{th}$ pixel adjacent to x, and the pixel in the upper left corner of the central pixel x is marked as $x_0$, other adjacent pixels are numbered clockwise, $i=\{0, 1, 2, \ldots, N-1\}$, N represents the number of adjacent pixels forming the local activation output, and sign is a sign function.

Preferably, in the step of providing an appropriate number of local activation channels and activation directions during forward propagation, to obtain locally activated feature maps with different activation directions, the feature maps are locally activated during forward propagation by:

$$F^{l,b} = \sum_{i=0}^{N} LBA_i(F^l)$$

wherein $F^l$ represents an input feature map on the $l^{th}$ layer, $F^{l,b}$ represents a locally activated feature map on the $l^{th}$ layer, represents binary quantization, $LBA_i$ represents a local activation function in a specific activation direction, N represents the number of local activation channels, and N has a value range of $N=\{1, 2, 3, \ldots, 8\}$;

N=1, the locally activated feature map is as follows:

$F^{l,b}=LBA_i(F^l)$, $i \in \{0,1,2, \ldots ,7\}$.

N=2, the locally activated feature map is as follows:

$F^{l,b}=LBA_i(F^l)+LBA_j(F^l)$, $i,j \in \{0,1,2, \ldots ,7\}$, $i \neq j$.

N=3, the locally activated feature map is as follows:

$F^{l,b}=LBA_i(F^l)+LBA_j(F^l)+LBA_k(F^l)$, $i,j,k \in \{0,1, 2, \ldots ,7\}$, $i \neq j \neq k$.

N=4, the locally activated feature map is as follows:

$F^{l,b}=LBA_i(F^l)+LBA_j(F^l)+LBA_k(F^l)+LBA_l(F^l)$, $i,j,k, l \in \{0,1,2, \ldots ,N-1\}, i \neq j \neq k \neq l$.

N=5, the locally activated feature map is as follows:

$F^{l,b}=LBA_i(F^l)+LBA_j(F^l)+LBA_k(F^l)+LBA_l(F^l)+LBA_m(F^l)$, $i,j,k,l,m \in \{0,1,2, \ldots ,N-1\}, i \neq j \neq k \neq l \neq m$;

N=6, the locally activated feature map is as follows:

$F^{l,b}=LBA_i(F^l)+LBA_j(F^l)+LBA_k(F^l)+LBA_l(F^l)+LBA_m(F^l)+LBA_n(F^l)$, $i,j,k,l,m,n \in \{0,1,2, \ldots ,N-1\}, i \neq j \neq k \neq l \neq m \neq n$;

N=7, the locally activated feature map is as follows:

$F^{l,b}=LBA_i(F^l)+LBA_j(F^l)+LBA_k(F^l)+LBA_l(F^l)+LBA_m(F^l)+LBA_n(F^l)+LBA_o(F^l)$, $i,j,k,l,m,n,o \in \{0,1, 2, \ldots ,N-1\}, i \neq j \neq k \neq l \neq m \neq n \neq o$; and N=8, the locally activated feature map is as follows:

$$F^{l,b} = \sum_{i=0}^{7} LBA_i(F^l), i = \{0, 1, 2, \ldots , 7\}.$$

Yet further, in the step of fusing, by a weight coefficient that can be learned, the feature maps output after local activation and direct activation, to obtain the output feature maps containing both texture features and contour features, the fusion method is:

$$F^{l+1} = \alpha^* BinConv(DBA(F^l), W) + \sum_{i=0}^{N-1} \beta_i^* BinConv(LBA_i(F^l), W_i)$$

wherein $F^l$ represents an input feature map on the $l^{th}$ layer, $F^{l+1}$ represents an input feature map on the $l+1^{th}$ layer, DBA represents a direct activation function, $LBA_i$ represents a local activation output in a specific activation direction, w represents a binary weight of a direct activation channel, $W_i$ represents a binary weight of the $i^{th}$ local activation channel, BinConv represents binary convolution operation, $\alpha$ represents the weight coefficient of the direct activation channel, and $\beta_i$ represents the weight coefficient of the local activation channel, wherein $\alpha$ and $\beta_i$ can be updated during back gradient propagation.

Further, in the step of updating, by an asymptotic sine function, weights of the BNN during back propagation, to obtain the BNN with updated gradients, the asymptotic sine function is:

$$f(x) = \begin{cases} \sin(tx) & |x| < \frac{\pi}{2t} \\ \text{sign}(x) & |x| \geq \frac{\pi}{2t} \end{cases}$$

$$\frac{\partial f(x)}{\partial x} = \begin{cases} t\cos(tx)|x| < \frac{\pi}{2t} \\ 0 |x| \geq \frac{\pi}{2t} \end{cases}$$

wherein t is a hyper-parameter positively related to the number of training steps, sin is a sine function, cos is a cosine function, sign is a sign function, and $$\frac{\pi}{2t}$$

is a connection point of piecewise functions.

A BNN-based local activation system is provided, comprising:
a local activation unit configured to compare all pixels and adjacent pixels thereof in an input image, to determine a local activation value of each pixel;
an activation combination unit configured to acquire locally activated feature maps with different activation directions; and
a fusion unit configured to fuse channels of the feature maps output after local activation and direct activation, to obtain the output feature maps containing both texture features and contour features.

A BNN-based local activation system is provided, comprising:
a processor; and
a memory configured to store computer executable instructions which, when executed, enable the processor to perform the following operations of:
comparing all pixels and adjacent pixels thereof in an input image during forward propagation, to determine a local activation value of each pixel;
providing an appropriate number of local activation channels and activation directions during forward propagation, to obtain locally activated feature maps with different activation directions;
fusing, by a weight coefficient that can be learned, the channels of the feature maps output after local activation and direct activation during forward propagation, to obtain the output feature maps containing both texture features and contour features; and
updating, by an asymptotic sine function, weights of the BNN during back propagation, to obtain the BNN with updated gradients.

A computer-readable storage medium is provided, which stores one or more programs which, when executed by an electronic device containing a plurality of application programs, enable the electronic device to perform the following operations of:
comparing all pixels and adjacent pixels thereof in an input image during forward propagation, to determine a local activation value of each pixel;
providing an appropriate number of local activation channels and activation directions during forward propagation, to obtain locally activated feature maps with different activation directions;
fusing, by a weight coefficient that can be learned, the channels of the feature maps output after local activation and direct activation during forward propagation, to obtain the output feature maps containing both texture features and contour features; and
updating, by an asymptotic sine function, weights of the BNN during back propagation, to obtain the BNN with updated gradients.

The beneficial effects of the present invention are as follows. With the BNN-based local activation method provided in the present invention, the information lost in binary activation can be effectively reduced by extracting texture features of the input image by local activation and fusing the texture features with contour features extracted by direct activation during forward propagation, and the mismatch with gradients during back propagation can be reduced by updating the weights of the BNN by the asymptotic sine function during back propagation, thus improving the performance of the BNN.

DETAILED DESCRIPTION OF THE INVENTION

The present invention will be further described as below with reference to the accompanying drawings.

Referring to FIGS. 1 to 4, a Binary Neural Network (BNN)-based local activation method is provided. During forward propagation, the texture information lost in binary activation during forward propagation can be effectively reduced by extracting texture features of an input image by a local activation function and fusing feature maps output from direct and local activation channels by a weight coefficient that can be learned. During back propagation, the mismatch of updated gradients during back propagation of the BNN can be reduced by updating weights of the BNN by an asymptotic sine function, thus improving the recognition accuracy of the BNN.

To make the foregoing objectives, features and advantages of the present invention clearer or easier to understand, the method in the present invention will be further described in detail as below with reference to the accompanying drawings by embodiments.

Figure 1:
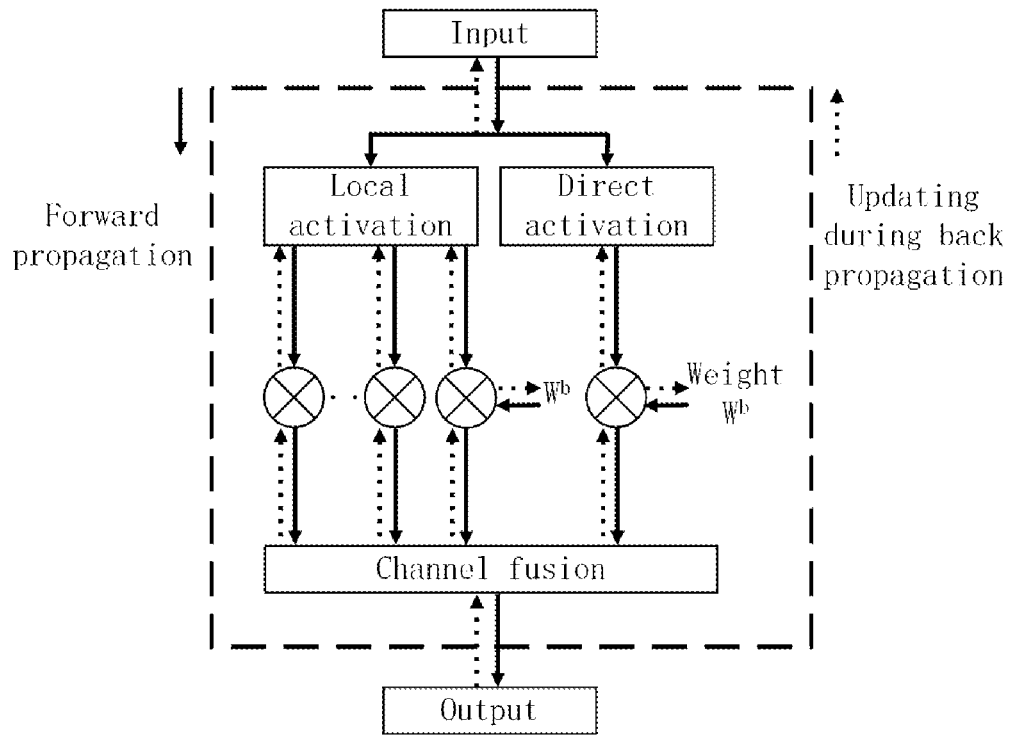
FIG. 1 is a flow chart of a BNN-based local activation method according to the present invention.

As shown FIG. 1, the BNN-based local activation method in the present invention comprises steps 1 to 4.

In the step 1, all pixels and adjacent pixels thereof in an input image are compared during forward propagation to determine a local activation value of each pixel, and each pixel in the input image is compared with 0 to determine a direct activation value of each pixel.

In the step 2, an appropriate number of local activation channels and activation directions are provided during forward propagation, to obtain locally activated feature maps with different activation directions.

In the step 3, the channels of the feature maps output after local activation and direct activation are fused by a weight coefficient that can be learned during forward propagation, to obtain the output feature maps containing both texture features and contour features.

In the step 4, weights of the BNN are updated by an asymptotic sine function during back propagation, to obtain the BNN with updated gradients.

In the step 1, the local activation and the direct activation specifically comprise following steps 1-1 and 1-2.

Figure 2:
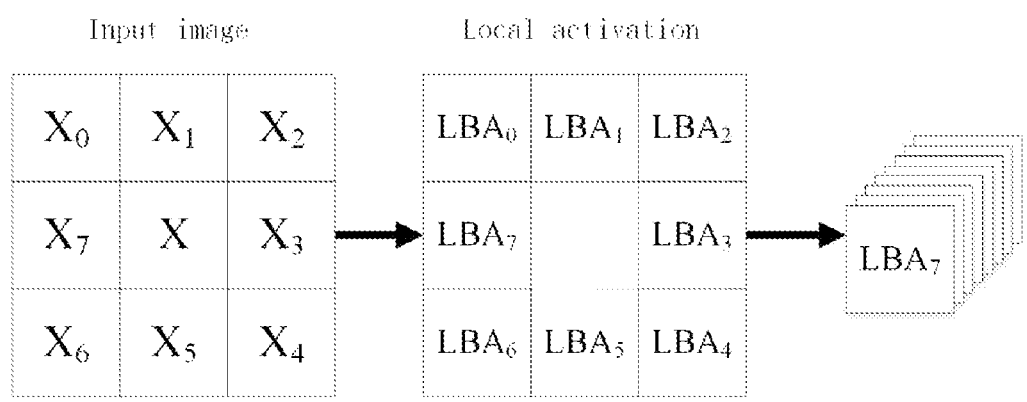
FIG. 2 is a schematic diagram of a local activation algorithm according to the present invention.

In the step 1-1, as shown in FIG. 2, a central pixel and adjacent pixels thereof in an input image are compared by the local activation function to determine the local activation value of each pixel. The activation function is:

$$LBA_j(x) = \text{sign}(x_j - x) = \begin{cases} -1 & x_j < x \\ +1 & x_j \geq x \end{cases};$$

wherein $LBA_j(x)$ is a local activation output in a specific activation direction, x represents the central pixel to be activated, $x_j$ represents the $j^{th}$ pixel adjacent to x, j={0, 1, 2, ... N}, N represents the number of adjacent pixels forming the local activation output, and sign is a sign function.

In the step 1-2, each pixel in the input image is compared with 0 by a direct activation function to determine the direct activation value of each pixel. The direct activation function is:

$$DBA(x) = \text{sign}(x) = \begin{cases} -1 & x < 0 \\ +1 & x \geq 0 \end{cases};$$

wherein $DBA(x)$ is the direct activation function, x represents the central pixel to be activated, and sign is the sign function.

In the step 2, an appropriate number of local activation channels and activation directions are provided during forward propagation, to obtain locally activated feature maps with different activation directions and different number of channels. The step specifically comprises a step below.

N=4 is set, the local activation function adopted for feature activation is:

$$F^{l,b} = LBA_0(F^l) + LBA_3(F^l) + LBA_5(F^l) + LBA_7(F^l)$$

wherein $F^l$ represents an input feature map on the $l^{th}$ layer, $F^{l,b}$ represents a locally activated feature map on the $l^{th}$ layer, b represents binary quantization, and $LBA_0$, $LBA_3(F^l)$, $LBA_5(F^l)$ and $LBA_7(F^l)$ represent locally activated feature maps in specific activation directions.

In the step 3, the feature maps output after local activation and direct activation are fused by a weight coefficient that can be learned, to obtain the output feature maps containing both texture features and contour features. The fusion function is:

$$F^{l+1} = \alpha * BinConv(DBA(F^l), W) + \sum_{j=0}^{N-1} \beta_j * BinConv(LBA_j(F^l), W_j)$$

wherein $F^l$ represents an input feature map on the $l^{th}$ layer, $F^{l+1}$ represents an input feature map on the $l+1^{th}$ layer, DBA represents a direct activation function, $LBA_j$ represents a local activation output in a specific activation direction, w represents a binary weight of a direct activation channel, $W_j$ represents a binary weight of the $j^{th}$ local activation channel, BinConv represents binary convolution operation, $\alpha$ represents the weight coefficient of the direct activation channel, and $\beta_j$ represents the weight coefficient of the local activation channel.

In the step 4, the sign activation function is approximated by the asymptotic sine function, thereby reducing the mismatch with updated gradients during back propagation. The asymptotic sine function is:

$$f(x) = \begin{cases} \sin(tx) & |x| < \frac{\pi}{2t} \\ \text{sign}(x) & |x| \geq \frac{\pi}{2t} \end{cases}$$

$$\frac{\partial f(x)}{\partial x} = \begin{cases} t\cos(tx) & |x| < \frac{\pi}{2t} \\ 0 & |x| \geq \frac{\pi}{2t} \end{cases}$$

wherein t is a hyper-parameter, sin is a sine function, cos is a cosine function, sign is the sign function, and $$\frac{\pi}{2t}$$

is a connection point of piecewise functions. The value of the hyper-parameter t is obtained by:

$$t = t_{min} \times \left(\frac{t_{max}}{t_{min}}\right)^{\frac{T_{cur}}{T_{max}}};$$

wherein the parameter $t_{min}$ is set to $\pi/3$, and the parameter $t_{max}$ is set to $1.5\pi$, $T_{cur}$ is the number of current training steps, and $T_{max}$ is the maximum number of training steps.

Preferably, in order to maintain the accuracy of the BNN, no binary conversion is performed on model parameters of the first and last layers of the BNN.

The above method in the present invention is verified on CIFAR-10, CIFAR-100 and SVHN standard data sets respectively by an ResNet-20 model and four-channel local activation, and the results are shown in Table 1.

TABLE 1

| Data set | Optimal accuracy of other methods | Accuracy of the method herein |
|---|---|---|
| CIFAR-10 | 86.5 | 89.1 |
| CIFAR-100 | 55.6 | 61.2 |
| SVHN | 95.7 | 97.3 |

The above method in the present invention is verified on a CIFAR-10 data set by ResNet-18, ResNet-20, VGG-small model and four-channel local activation, and the results are shown in Table 2.

TABLE 2

| Model | Optimal accuracy of other methods | Accuracy of the method herein |
|---|---|---|
| ResNet-18 | 91.5 | 93.3 |
| ResNet-20 | 86.5 | 89.1 |
| VGG-small | 90.4 | 91.1 |

The above descriptions are merely embodiments of the present invention, but the scope of protection of the present invention is not limited thereto. Any equivalent variations or substitutions that may be readily obtained by those of skill in the art within the scope of technology disclosed in the present invention shall fall into the scope of protection of the present invention. Therefore, the scope of protection of the present invention shall be subject to the scope of protection of the claims.

Figure 3:
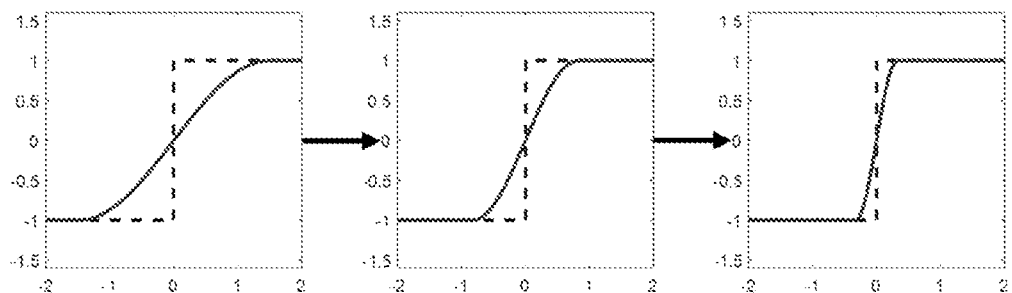
FIG. 3 is a schematic diagram of an asymptotic sine function according to the present invention.
Figure 4:
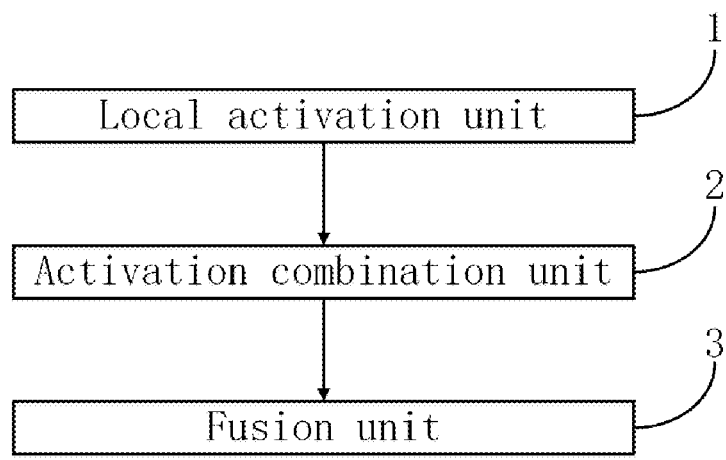
FIG. 4 is a module structural diagram of a BNN-based local activation system according to the present invention.

The present invention further provides a BNN-based local activation system. Specifically, as shown in FIG. 3, the BNN-based local activation system in the present invention comprises a local activation unit 1, an activation combination unit 2, and a fusion unit 3.

The local activation unit 1 is configured to compare all pixels and adjacent pixels thereof in an input image, to determine a local activation value of each pixel. The activation combination unit 2 is configured to acquire locally activated feature maps with different activation directions. The fusion unit 3 is configured to fuse channels of the feature maps output after local activation and direct activation, to obtain the output feature maps containing both texture features and contour features.

The present invention further provides a BNN-based local activation system, comprising a processor, and a memory.

The memory is configured to store computer executable instructions which, when executed, enable the processor to perform the following operations.

All pixels and adjacent pixels thereof in an input image are compared during forward propagation, to determine a local activation value of each pixel.

An appropriate number of local activation channels and activation directions are provided during forward propagation, to obtain locally activated feature maps with different activation directions.

The channels of the feature maps output after local activation and direct activation are fused by a weight coefficient that can be learned during forward propagation, to obtain the output feature maps containing both texture features and contour features.

Weights of the BNN are updated by an asymptotic sine function during back propagation, to obtain the BNN with updated gradients.

The present invention further provides a computer-readable storage medium, which stores one or more programs which, when executed by an electronic device containing a plurality of application programs, enable the electronic device to perform the following operations.

All pixels and adjacent pixels thereof in an input image are compared during forward propagation, to determine a local activation value of each pixel.

An appropriate number of local activation channels and activation directions are provided during forward propagation, to obtain locally activated feature maps with different activation directions.

The channels of the feature maps output after local activation and direct activation are fused by a weight coefficient that can be learned during forward propagation, to obtain the output feature maps containing both texture features and contour features.

Weights of the BNN are updated by an asymptotic sine function during back propagation, to obtain the BNN with updated gradients.

Compared with the prior art, the BNN-based local activation system and the computer readable storage medium have the same beneficial effects as the BNN-based local activation method in the present invention and thus will not be repeated herein.

Thus far, the technical solution of the present invention has been described by the preferred embodiments shown in the drawings, but those of skill in the art can readily understand that the protection scope of the present invention is obviously not limited to these embodiments. Without departing from the principle of the present invention, those of skill in the art can make equivalent variations or substitutions to related technical features, and the technical solutions after such variations or substitutions shall fall into the scope of protection of the present invention.

The invention claimed is:

1. A Binary Neural Network (BNN)-based local activation method, comprising following steps of:
comparing all pixels and adjacent pixels thereof in an input image during forward propagation, to determine a local activation value of each pixel;
providing an appropriate number of local activation channels and activation directions during forward propagation, to obtain locally activated feature maps with different activation directions;
fusing, by a weight coefficient that can be learned, the channels of the feature maps output after local activation and direct activation during forward propagation, to obtain the output feature maps containing both texture features and contour features; and
updating, by an asymptotic sine function, weights of the BNN during back propagation, to obtain the BNN with updated gradients.

2. The BNN-based local activation method according to claim 1, wherein, in the step of comparing all pixels and adjacent pixels thereof in an input image during forward propagation, to determine a local activation value of each pixel, the local activation value is determined by:

$$LBA_i(x) = \text{sign}(x_i - x) = \begin{cases} -1 & x_i < x \\ +1 & x_i \geq x \end{cases};$$

wherein $LBA_i(x)$ is a local activation output in a specific activation direction, X represents a central pixel to be activated, $x_i$ represents the $i^{th}$ pixel adjacent to x, and the pixel in the upper left corner of the central pixel x is marked as $x_0$, other adjacent pixels are numbered clockwise, i={0,1,2, . . . , N–1}, N represents the number of adjacent pixels forming the local activation output, and sign is a sign function.

3. The BNN-based local activation method according to claim 1, wherein, in the step of providing an appropriate number of local activation channels and activation directions during forward propagation, to obtain locally activated feature maps with different activation directions, the feature maps are locally activated during forward propagation by:

$$F^{l,b} = \sum_{i=0}^{N} LBA_i(F^l)$$

wherein $F^l$ represents an input feature map on the $l^{th}$ layer, $F^{l,b}$ represents a locally activated feature map on the $l^{th}$ layer, b represents binary quantization, $LBA_i$ represents a local activation function in a specific activation direction, N represents the number of local activation channels, and N has a value range of N={1,2,3, . . . , 8};

N=1, the locally activated feature map is as follows:

$F^{l,b}=LBA_i(F^l)$, i∈{0,1,2, . . . ,7}

N=2, the locally activated feature map is as follows:

$F^{l,b}=LBA_i(F^l)+LBA_j(F^l)$, i,j∈{0,1,2, . . . ,7},i≠j;

N=3, the locally activated feature map is as follows:

$F^{l,b}=LBA_i(F^l)+LBA_j(F^l)+LBA_k(F^l)$, i,j,k∈{0,1, 2, . . . ,7},i≠j≠k;

N=4, the locally activated feature map is as follows:

$F^{l,b}=LBA_i(F^l)+LBA_j(F^l)+LBA_k(F^l)+LBA_m(F^l)$ i,j,k, l∈{0,1,2, . . . ,N−1},i≠j≠k≠l;

N=5, the locally activated feature map is as follows:

$F^{l,b}=LBA_i(F^l)+LBA_j(F^l)+LBA_k(F^l)+LBA_l(F^l)+LBA_m$ $(F^l)$ i,j,k,l,m∈{0,1,2, . . . ,N−1},i≠j≠k≠l≠m;

N=6, the locally activated feature map is as follows:

$F^{l,b}=LBA_i(F^l)+LBA_j(F^l)+LBA_k(F^l)+LBA_l(F^l)+LBA_m$ $(F^l)+LBA_n(F^l)$ i,j,k,l,m,n∈{0,1,2, . . . ,N−1}, i≠j≠k≠l≠m≠n;

N=7, the locally activated feature map is as follows:

$F^{l,b}=LBA_i(F^l)+LBA_j(F^l)+LBA_k(F^l)+LBA_l(F^l)+LBA_m$ $(F^l)+LBA_n(F^l)+LBA_o(F^l)$ i,j,k,l,m,n,o∈{0,1, 2, . . . ,N−1},i≠j≠k≠l≠m≠n≠o; and N=8, the locally activated feature map is as follows:

$$F^{l,b} = \sum_{i=0}^{7} LBA_i(F^l), i = \{0, 1, 2, \ldots, 7\}.$$

4. The BNN-based local activation method according to claim 1, wherein, in the step of fusing, by a weight coefficient that can be learned, the channels of the feature maps output after local activation and direct activation, to obtain the output feature maps containing both texture features and contour features, the fusion method is:

$$F^{l+1} = \alpha * BinConv(DBA(F^l), W) + \sum_{i=0}^{N-1} \beta_i * BinConv(LBA_i(F^l), W_i)$$

wherein $F^l$ represents an input feature map on the $l^{th}$ layer, $F^{l+1}$ represents an input feature map on the $l+1^{th}$ layer, DBA represents a direct activation function, $LBA_i$ represents a local activation output in a specific activation direction, w represents a binary weight of a direct activation channel, $W_i$ represents a binary weight of the $i^{th}$ local activation channel, BinConv represents binary convolution operation, α represents the weight coefficient of the direct activation channel, and $β_i$ represents the weight coefficient of the local activation channel, wherein α and $β_i$ can be updated during back gradient propagation.

5. The BNN-based local activation method according to claim 1, wherein, in the step of updating, by an asymptotic sine function, weights of the BNN during back propagation, to obtain the BNN with updated gradients, the asymptotic sine function is:

$$f(x) = \begin{cases} \sin(tx) & |x| < \frac{\pi}{2t} \\ \text{sign}(x) & |x| \geq \frac{\pi}{2t} \end{cases}$$

$$\frac{\partial f(x)}{\partial x} = \begin{cases} t\cos(tx) & |x| < \frac{\pi}{2t} \\ 0 & |x| \geq \frac{\pi}{2t} \end{cases}$$

wherein t is a hyper-parameter positively related to the number of training steps, sin is a sine function, COS is a cosine function, sign is the sign function, and $$\frac{\pi}{2t}$$

is a connection point of piecewise functions.

6. A BNN-based local activation system, comprising:
a processor; and
a memory configured to store computer executable instructions which, when executed, enable the processor to perform the following operations of:
comparing all pixels and adjacent pixels thereof in an input image during forward propagation, to determine a local activation value of each pixel;
providing an appropriate number of local activation channels and activation directions during forward propagation, to obtain locally activated feature maps with different activation directions;
fusing, by a weight coefficient that can be learned, the channels of the feature maps output after local activation and direct activation during forward propagation, to obtain the output feature maps containing both texture features and contour features; and
updating, by an asymptotic sine function, weights of the BNN during back propagation, to obtain the BNN with updated gradients.

7. A non-transitory computer-readable storage medium which stores one or more programs which, when executed by an electronic device containing a plurality of application programs, enable the electronic device to perform the following operations of:
comparing all pixels and adjacent pixels thereof in an input image during forward propagation, to determine a local activation value of each pixel;
providing an appropriate number of local activation channels and activation directions during forward propagation, to obtain locally activated feature maps with different activation directions;

fusing, by a weight coefficient that can be learned, the channels of the feature maps output after local activation and direct activation during forward propagation, to obtain the output feature maps containing both texture features and contour features; and updating, by an asymptotic sine function, weights of the BNN during back propagation, to obtain the BNN with updated gradients.

8. The BNN-based local activation method according to claim 2, wherein, in the step of providing an appropriate number of local activation channels and activation directions during forward propagation, to obtain locally activated feature maps with different activation directions, the feature maps are locally activated during forward propagation by:

$$F^{l,b} = \sum_{i=0}^{N} LBA_i(F^l)$$

wherein $F^l$ represents an input feature map on the $l^{th}$ layer, $F^{l,b}$ represents a locally activated feature map on the $l^{th}$ layer, b represents binary quantization, $LBA_i$ represents a local activation function in a specific activation direction, N represents the number of local activation channels, and N has a value range of N={1,2,3, ..., 8};

N=1, the locally activated feature map is as follows:

$F^{l,b}=LBA_i(F^l)$, $i \in \{0,1,2, ...,7\}$;

N=2, the locally activated feature map is as follows:

$F^{l,b}=LBA_i(F^l)+LBA_j(F^l)$, $i,j \in \{0,1,2, ...,7\}, i \neq j$;

N=3, the locally activated feature map is as follows:

$F^{l,b}=LBA_i(F^l)+LBA_j(F^l)+LBA_k(F^l)$, $i,j,k \in \{0,1,2, ...,7\}, i \neq j \neq k$;

N=4, the locally activated feature map is as follows:

$F^{l,b}=LBA_i(F^l)+LBA_j(F^l)+LBA_k(F^l)+LBA_k(F^l)$ $i,j,k,l \in \{0,1,2, ...,N-1\}, i \neq j \neq k \neq l$;

N=5, the locally activated feature map is as follows:

$F^{l,b}=LBA_i(F^l)+LBA_j(F^l)+LBA_k(F^l)+LBA_l(F^l)+LBA_m(F^l)$ $i,j,k,l,m \in \{0,1,2, ...,N-1\}, i \neq j \neq k \neq l \neq m$;

N=6, the locally activated feature map is as follows:

$F^{l,b}=LBA_i(F^l)+LBA_j(F^l)+LBA_k(F^l)+LBA_l(F^l)+LBA_m(F^l)+LBA_n(F^l)$ $i,j,k,l,m,n \in \{0,1,2, ...,N-1\}, i \neq j \neq k \neq l \neq m \neq n$;

N=7, the locally activated feature map is as follows:

$F^{l,b}=LBA_i(F^l)+LBA_j(F^l)+LBA_k(F^l)+LBA_l(F^l)+LBA_m(F^l)+LBA_n(F^l)+LBA_o(F^l)$ $i,j,k,l,m,n,o \in \{0,1, 2, ...,N-1\}, i \neq j \neq k \neq l \neq m \neq n \neq o$; and N=8, the locally activated feature map is as follows:

$$F^{l,b} = \sum_{i=0}^{7} LBA_i(F^l), i = \{0, 1, 2, ..., 7\}.$$

9. The BNN-based local activation method according to claim 2, wherein, in the step of fusing, by a weight coefficient that can be learned, the channels of the feature maps output after local activation and direct activation, to obtain the output feature maps containing both texture features and contour features, the fusion method is:

$$F^{l+1} = \alpha * BinConv(DBA(F^l), W) + \sum_{i=0}^{N-1} \beta_i * BinConv(LBA_i(F^l), W_i)$$

wherein $F^l$ represents an input feature map on the $l^{th}$ layer, $F^l+1$ represents an input feature map on the $l+1^{th}$ layer, DBA represents a direct activation function, $LBA_i$ represents a local activation output in a specific activation direction, w represents a binary weight of a direct activation channel, $W_i$ represents a binary weight of the $i^{th}$ local activation channel, BinConv represents binary convolution operation, $\alpha$ represents the weight coefficient of the direct activation channel, and $\beta_i$ represents the weight coefficient of the local activation channel, wherein $\alpha$ and $\beta_i$ can be updated during back gradient propagation.

10. The BNN-based local activation method according to claim 2, wherein, in the step of updating, by an asymptotic sine function, weights of the BNN during back propagation, to obtain the BNN with updated gradients, the asymptotic sine function is:

$$f(x) = \begin{cases} \sin(tx) & |x| < \frac{\pi}{2t} \\ \text{sign}(x) & |x| \geq \frac{\pi}{2t} \end{cases}$$

$$\frac{\partial f(x)}{\partial x} = \begin{cases} t\cos(tx) & |x| < \frac{\pi}{2t} \\ 0 & |x| \geq \frac{\pi}{2t} \end{cases}$$

wherein t is a hyper-parameter positively related to the number of training steps, sin is a sine function, COS is a cosine function, sign is the sign function, and $$\frac{\pi}{2t}$$

is a connection point of piecewise functions.

* * * * *